United States Patent [19]

Beaudry

[11] Patent Number: 5,689,913
[45] Date of Patent: Nov. 25, 1997

[54] PLANT DEVELOPMENT AFFECTING DEVICE AND METHOD

[75] Inventor: Randolph M. Beaudry, East Lansing, Mich.

[73] Assignee: Board of Trustees operating Michigan State University, East Lansing, Mich.

[21] Appl. No.: 698,773

[22] Filed: Aug. 16, 1996

Related U.S. Application Data

[60] Continuation of Ser. No. 503,986, Jul. 19, 1995, abandoned, which is a division of Ser. No. 385,350, Feb. 8, 1995, Pat. No. 5,525,130.

[51] Int. Cl.$^6$ ............................................. A01C 1/00
[52] U.S. Cl. .................... 47/1.5; 47/58; 47/57.5; 405/116
[58] Field of Search .................. 47/1.01, 58, 57.5; 504/1.5, 116

[56] References Cited

U.S. PATENT DOCUMENTS

| Re. 28,995 | 10/1976 | Burg . |
| 2,923,632 | 2/1960 | Castberg . |
| 3,069,274 | 12/1962 | Concannon . |
| 3,620,765 | 11/1971 | McDonnell et al. . |
| 3,798,333 | 3/1974 | Cummin et al. . |
| 3,924,010 | 12/1975 | Erb . |
| 4,528,228 | 7/1985 | Clevenger . |
| 4,622,229 | 11/1986 | Toshitsugu . |
| 4,651,468 | 3/1987 | Martinez ................... 47/57.5 |
| 4,764,389 | 8/1988 | LaBarge . |
| 5,162,052 | 11/1992 | Hoffmann ............ 47/48.5 X |
| 5,201,925 | 4/1993 | Itzel ........................ 47/1.5 |

OTHER PUBLICATIONS

Kays, S. and Beaudry, R. in Acta Horticulturae 201 77–115 (1987).
Burg, S. et al., Plant Physiol 42 144–152 (1987).
Manometric Techniques, Burgess Publishing Company, Minneapolis, Minnesota, pp. 44 and 45 (1964).
Oeller, Paul W., et al., Science, vol. 254 pp. 437–439 (1991).

*Primary Examiner*—Henry E. Raduazo
*Attorney, Agent, or Firm*—Ian C. McLeod

[57] ABSTRACT

A patch (10, 30, 40) or other device applied to a fruit or vegetable for releasing a gas, preferably ethylene, which accelerates maturation or which retards maturation, preferably carbon dioxide. The device attaches to a portion of the fruit or vegetable and releases the gas upon application or upon demand. Ripening or retardation is selective in a bunch of connected fruits such as bananas when applied to one finger, thereby providing selective ripening.

6 Claims, 6 Drawing Sheets

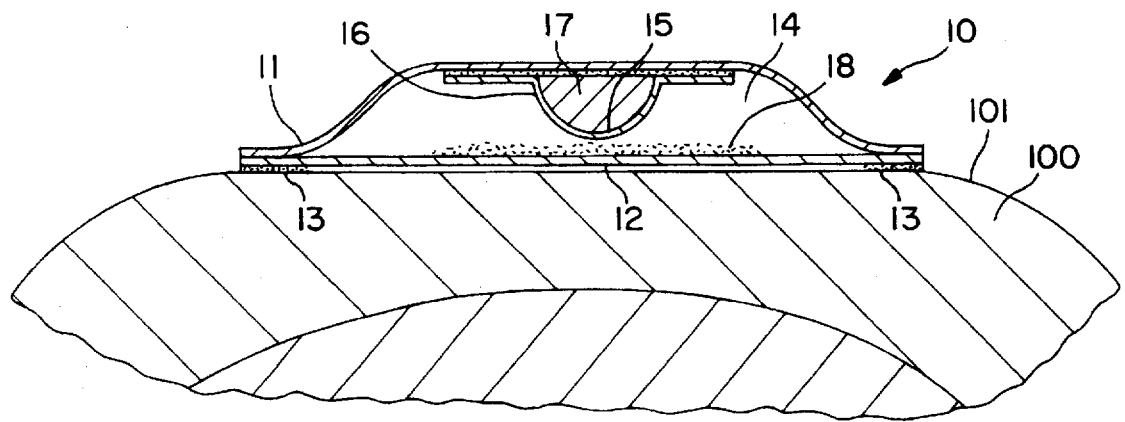
FIG. 1
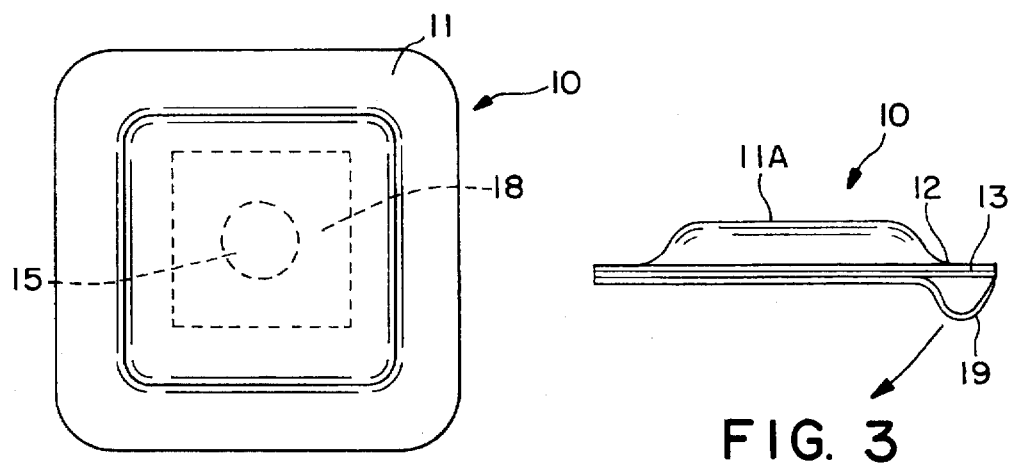
FIG. 2
FIG. 3
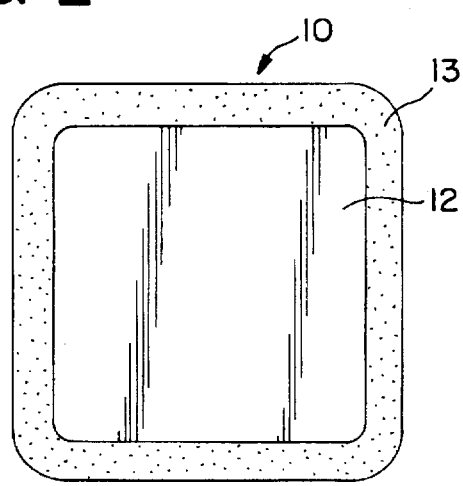
FIG. 4

PLANT DEVELOPMENT AFFECTING DEVICE AND METHOD

This application is a continuation of application Ser. No. 08/503,986 filed on Jul. 19, 1995 now abandoned which is a division of Ser. No. 08/385,350, filed Feb. 8, 1995 and now U.S. Pat. No. 5,525,130.

BACKGROUND OF THE INVENTION (1) Field of the Invention

The present invention relates to a device which releases a development affecting gas for affecting the development of plant materials and to a method for use of the device. In particular, the present invention relates to a method for initiating ripening or retarding ripening of a fruit or vegetable, particularly with ethylene.

(2) Description of Related Art

Ethylene and other growth affecting gases have been used in storage rooms to modify the natural growth rate of plant materials including whole plants and plant parts such as fruits and vegetables. Such storage room systems are described in U.S. Pat. Nos. 3,620,765 to McDonnell et al; 3,924,010 to Erb; Re 28,995 to Burg and 4,764,389 to LaBarge. These systems can only be used by wholesalers and others dealing in bulk fruits and vegetables.

The prior art has described various forms of packaging to inhibit or accelerate growth of fruits or vegetables. U.S. Pat. Nos. 3,069,274 to Concannon; 3,798,333 to Cummin; 4,528,228 to Clevenger and 4,622,229 to Toshitsugu are illustrative of such packaging. The common concept is the provision of a gas to facilitate ripening or the removal of a gas (ethylene) by the package to retard ripening of the fruit or vegetable. Such packaging can be expensive and the effect on development is subject to variation depending upon the handling and storage of the fruit or vegetable.

The prior art has described the treatment of plants to prevent fungal or other microorganism infection of cut or exposed portions. Illustrative is U.S. Pat. No. 2,923,632 to Castberg. Such treatments can only be used where the portion of the plant being treated is not eaten. Further, unless the fungicide or other chemical is safe for food purposes, it is difficult to obtain approval to market such devices. In any event, such devices are not used to affect the development (ripening or retarded ripening) of the plant material.

The prior art has described numerous chemicals for producing ripening in the manner of ethylene. They are particularly set forth by Kays, S. and Beaudry, R. in Acta Horticulturae 201 77–115 (1987). Burg, S. et al., Plant Physiol. 42 144–152 (1987) describes various unsaturated organic compounds as substitutes for ethylene to provide ripening of fruits and vegetables. Alternatively, carbon dioxide and other carbon-oxygen gases have been used to retard ripening of fruits and vegetables.

The problem has been to provide a convenient, on demand method and means for initiating the ripening and/or retardation of ripening of the fruit or vegetable.

OBJECTS

It is therefore an object of the present invention to provide a device and method of use of the device which allows on demand triggering of the initiation of fruit ripening and/or retardation of ripening of a fruit or vegetable. Further, it is an object of the present invention to provide a device which is inexpensive and easy to construct and which is easy to use and reliable. These and other objects will become increasingly apparent by reference to the following description and the drawings.

IN THE DRAWINGS

FIG. 1 is a front cross-sectional view of a fruit patch 10 which is used to ripen a fruit, such as a banana 100, by application to the surface or skin 101 of the fruit.

FIG. 2 is a top plan view of the patch 10 of FIG. 1, showing an aluminized polymer shell 11.

FIG. 3 is a side view of the patch 10 of FIG. 1 showing a domed portion 11A of the shell 11.

FIG. 4 is bottom view of the patch 10 of FIG. 1 showing a gas permeable sheet 12 and an adhesive strip 13 which allows the patch 10 to be adhered to the fruit.

Figure 5:
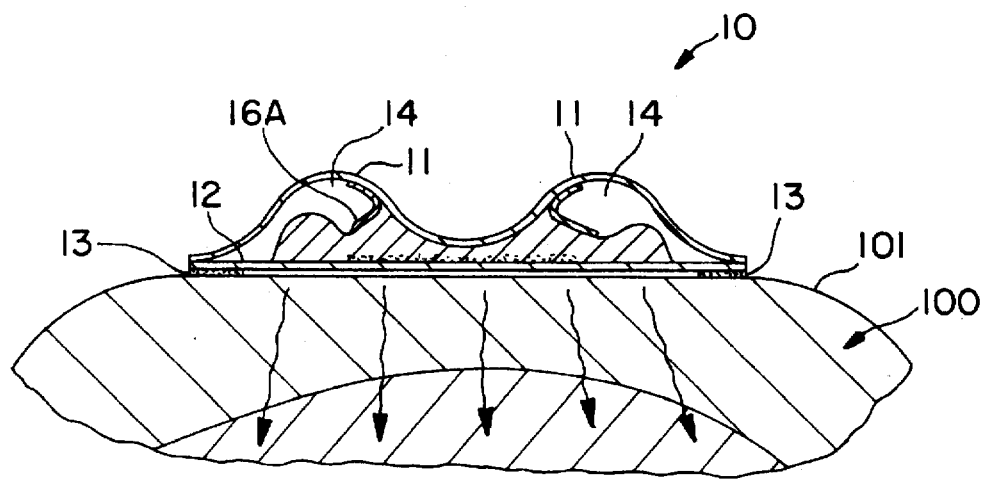

FIG. 5 is a front cross-sectional view of patch 10 after the button 15 has been ruptured to release a buffered gel 17 such that it contacts a pH-sensitive ethylene-releasing compound 18, thereby causing the release of ethylene which permeates the fruit.

Figure 6:
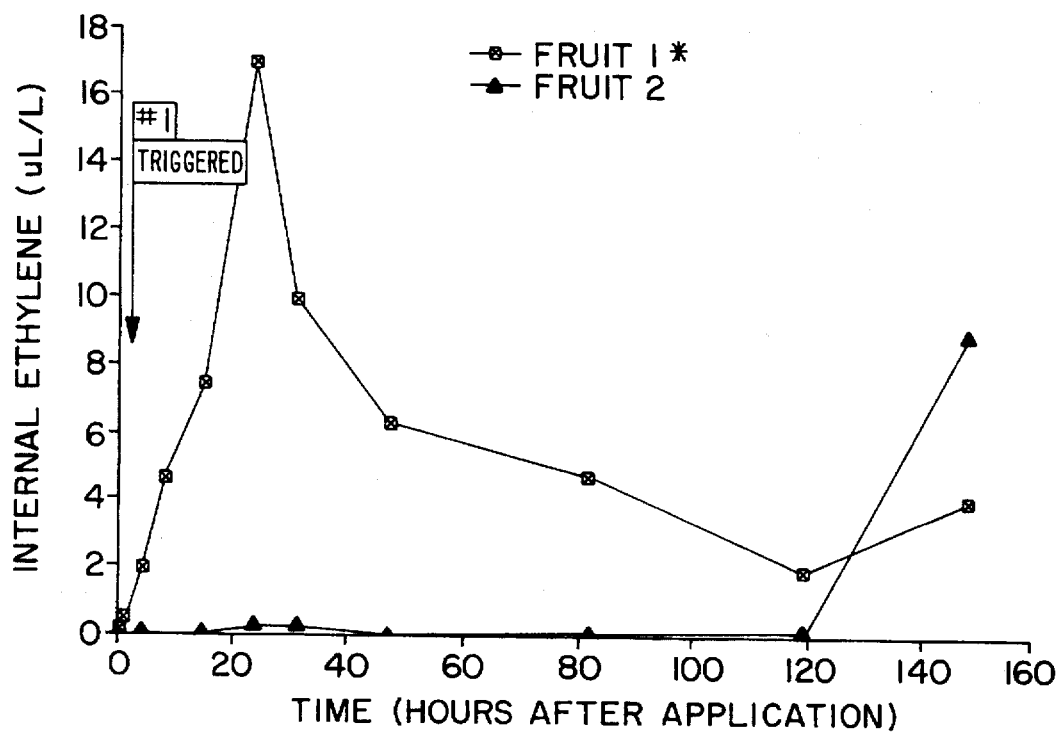

FIG. 6 is a graph showing the development of ethylene in one banana in a bunch of bananas after rupture of the cover 16 of button 15 of patch 10 of FIG. 1 on the one banana to produce the ruptured cover 16A as shown in FIG. 5. Fruit 1 is with the patch 10 and Fruit 2 in the bunch is without the patch 10.

Figure 7:
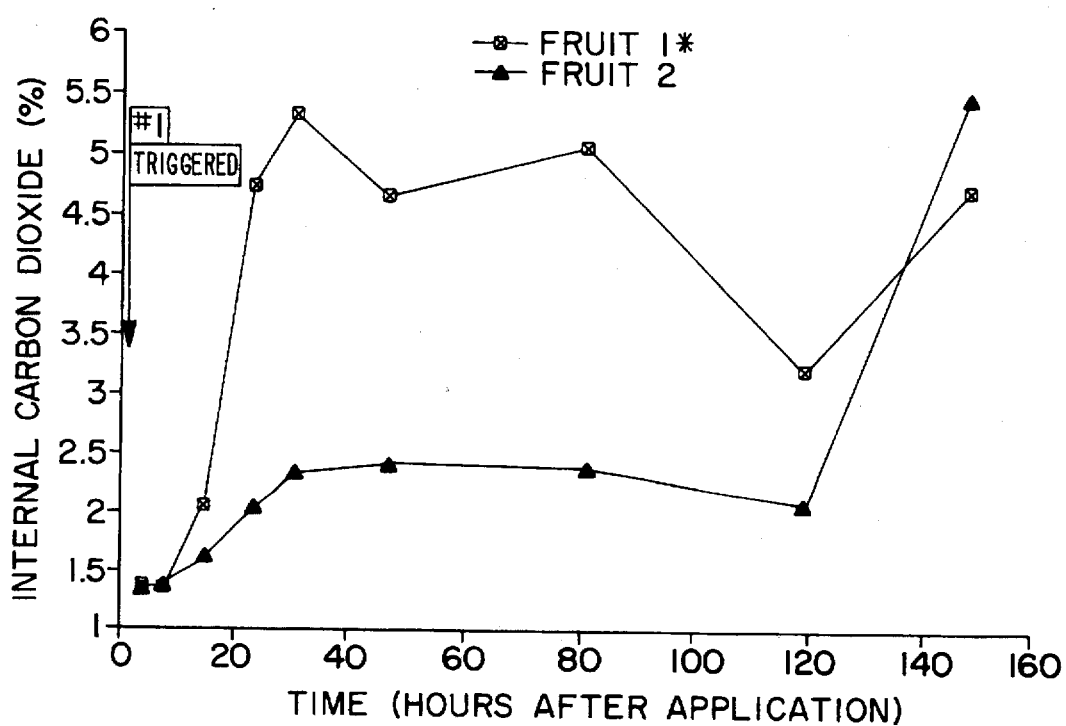

FIG. 7 is a graph showing the development of carbon dioxide in one banana with the patch 10 in the bunch of bananas of FIG. 6. Fruits 1 and 2 are the same as in FIG. 6. Carbon dioxide development increases with ethylene increase.

Figure 8:
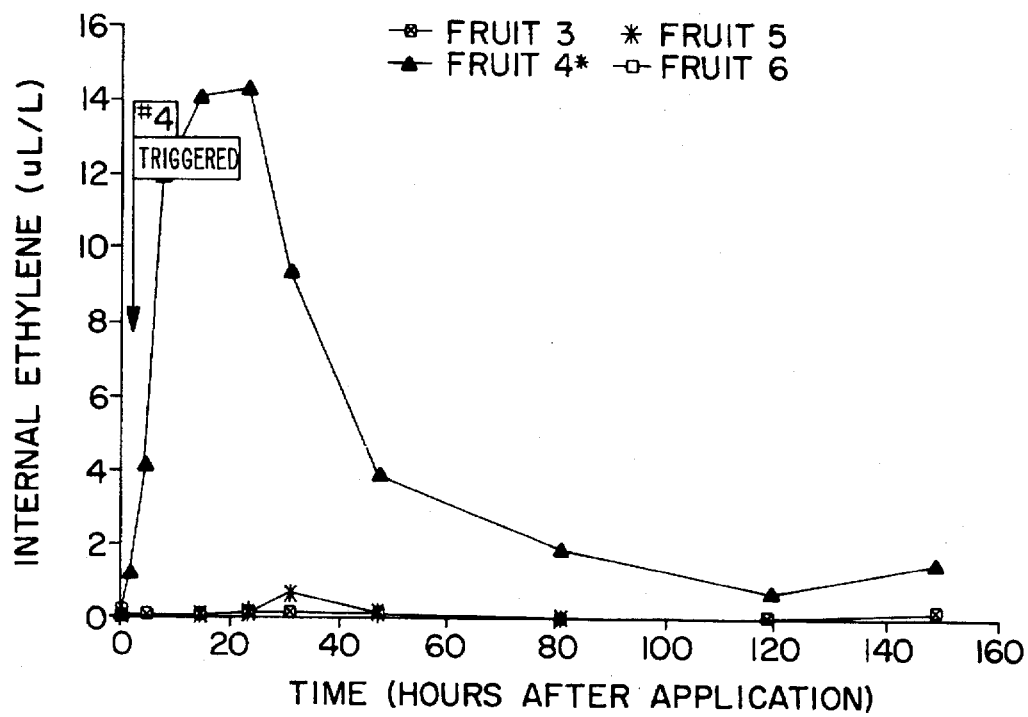

FIG. 8 is a graph showing ethylene production in a banana with the device 10 (Fruit 4) versus four (4) other bananas in a bunch (Fruits 3, 5 and 6).

Figure 9:
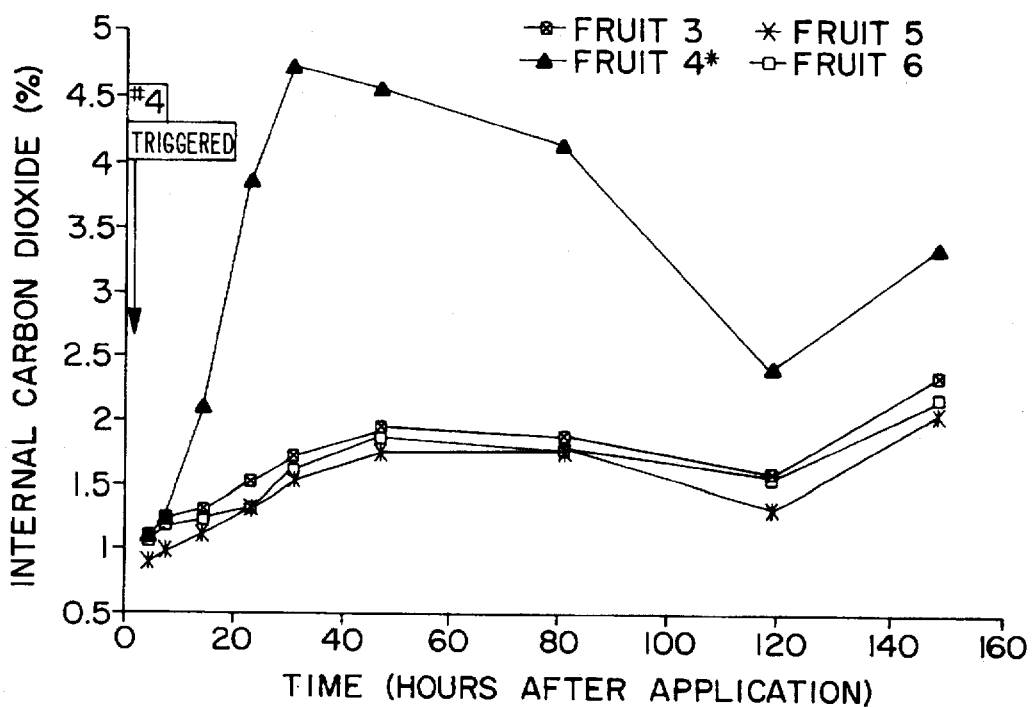

FIG. 9 is a graph showing the development of carbon dioxide in the fruits 3 to 6 as shown in FIG. 8 with and without the patch 10.

Figure 10:
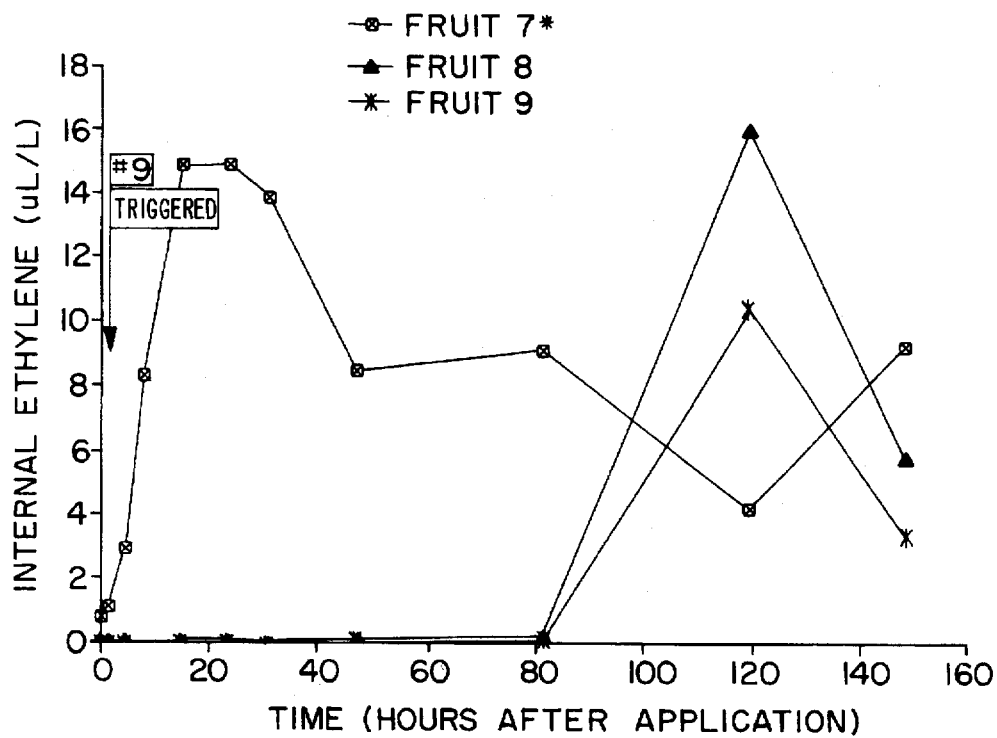

FIG. 10 is a graph showing the development of ethylene bananas in a bunch with the patch 10 (Fruit 7) versus other bananas without the patch 10 (Fruits 8 and 9).

Figure 11:
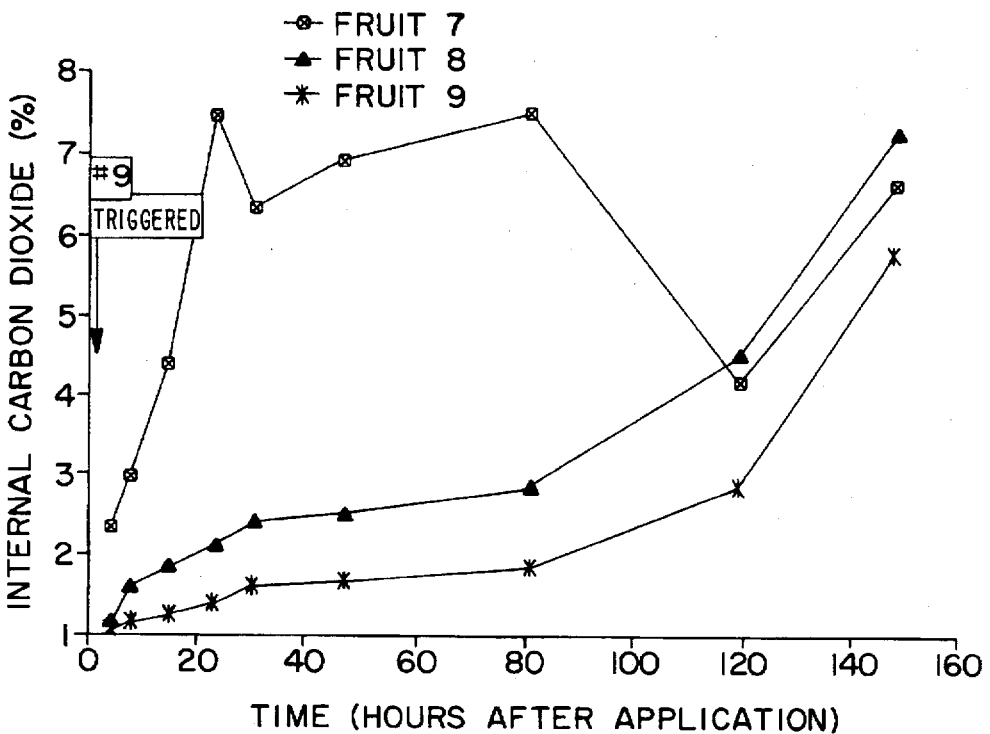

FIG. 11 shows the development of carbon dioxide in Fruits 7 to 9 as shown in FIG. 10.

Figure 12:
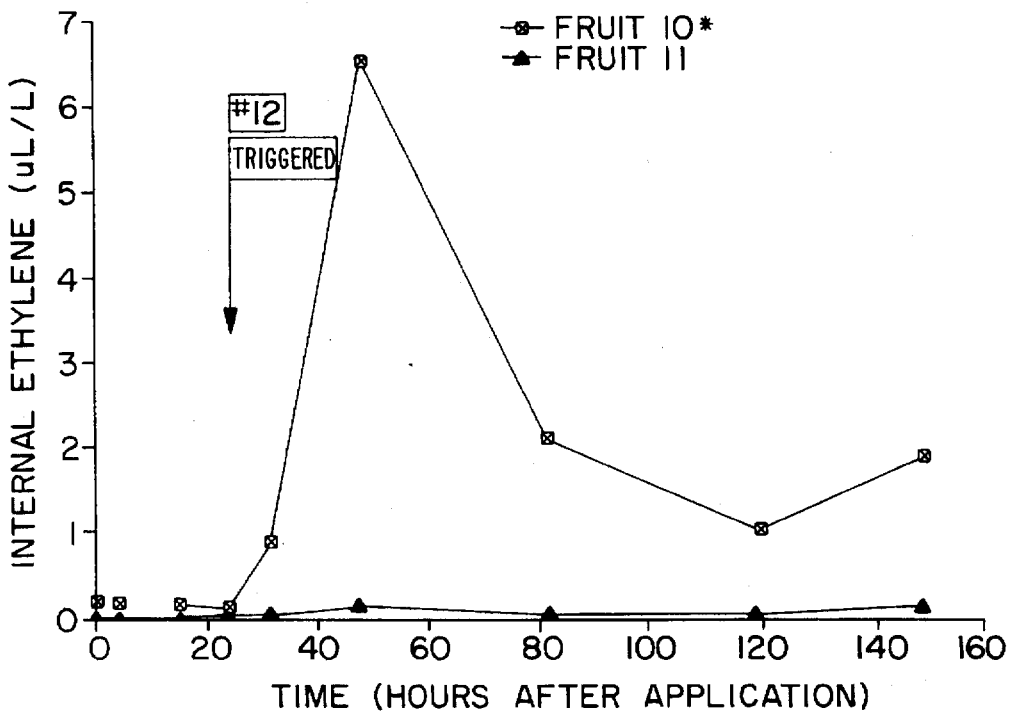

FIG. 12 shows the development of ethylene twenty-four (24) hours after application of the device 10 on a banana (Fruit 10) and without the device 10 (Fruit 11).

Figure 13:
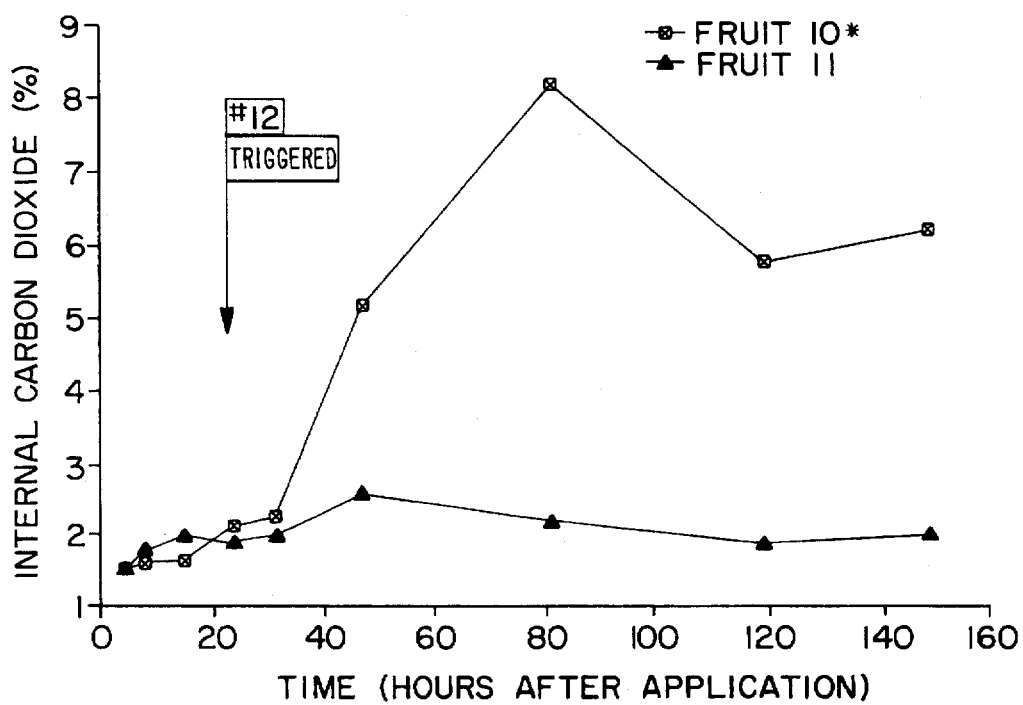

FIG. 13 is a graph showing the development of carbon dioxide in fruits 10 and 11 as shown in FIG. 12.

Figure 14:
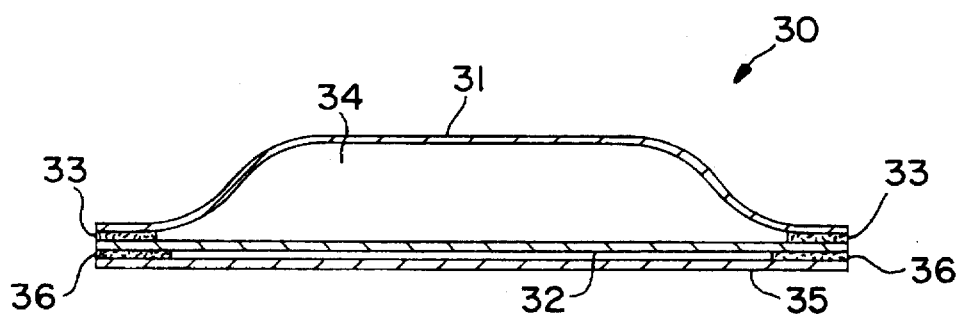

FIG. 14 is a front cross-sectional view of a patch 30 in ethylene gas is provided in space 34 as a purified gas or from the release of ethylene from an ethylene releasing compound that spontaneously breaks down to release ethylene without the addition of other compounds. The ethylene diffuses through porous sheet 31 to fruit 100 when gas impermeable sheet 35 is removed.

Figure 15:
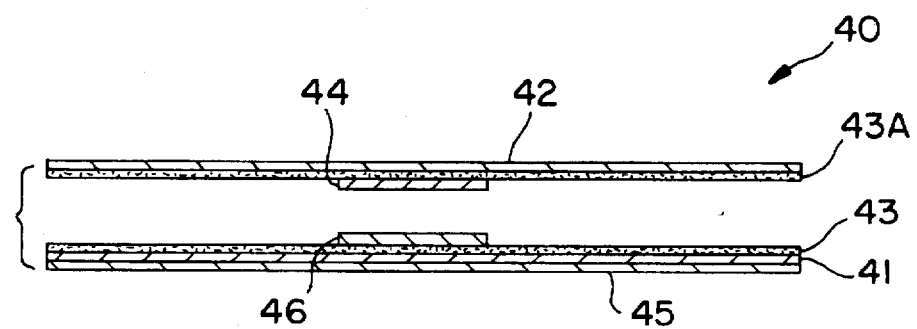

FIG. 15 shows a front cross-section of a patch 40 wherein (2-chloroethyl) phosphonic acid (ethrel) 44 and a base 46 are combined when tapes 41 and 43 are pressed together. Adhesive 45 is used to apply patch 40 to the fruit 100.

DESCRIPTION OF PREFERRED EMBODIMENTS

The present invention relates to a device for use on a living plant material to affect development of the plant material which comprises a container means containing a chemical which contains a development affecting gas, wherein the container means has a layer which is pervious to the gas; and an adhesive on an exposed portion of the container means so that the device can be sealed on the plant material to release the gas through the layer.

In particular, the present invention relates to a device for use on a living plant material to affect development of the plant material which comprises a container means with a first composition inside the container means which contains a chemical from which a development affecting gas can be released; a second composition inside the container means which allows the gas to be selectively released from the first composition, wherein the container means is a pouch with (i) a first layer which is impervious to the gas and (ii) a second layer pervious to the gas and wherein the portions of first and second layers are sealed together to form the pouch with the first and second compositions inside the pouch; and an adhesive applied to an outside part of the second layer so as to allow the device to be sealed on an exposed surface of the plant material and to allow the gas to penetrate through the second layer to the plant material, wherein in use the first and second compositions are selectively acted upon to release the gas.

Further the present invention relates to a device for use on a living plant material to affect maturation of the plant material which comprises a patch with a first composition inside the patch which contains a chemical from which a development affecting gas can be released upon the application of pressure to the device and a second composition separated from the first composition inside the device which allows the gas to be selectively released from the first composition when combined with the first composition by the application of pressure, wherein the pouch has a (i) a first layer impervious to the gas which allows the pressure to be applied to the patch to release the gas and (ii) a second layer pervious to the gas, wherein the portions of first and second layers are sealed together to form the pouch with the first and second compositions mounted separately inside the pouch; and an adhesive applied to an outside part of the second layer so as to allow the device to be sealed on an exposed surface of the plant material and to allow the gas to penetrate through the second layer to the plant material, wherein when pressure is applied to the first layer and the first and second compositions are combined to release the gas.

Finally, the present invention relates to a method for affecting the development of a living plant material which comprises a device for use on a living plant material to affect development of the plant material which comprises a container means containing a chemical which releases a development affecting gas, wherein the container means has a layer which is pervious to the gas; and an adhesive on an exposed portion of the container means so that the device can be sealed on the plant material to release the gas through the layer; applying the container means to the plant material so that the gas is released, wherein the development of the plant material is affected.

FIGS. 1 to 4 show a patch 10 which is applied to the surface or skin of a fruit or vegetable such as skin 101 of banana 100. The device includes an outer shell 11 with a domed portion 11A. The shell 11 is closed by a gas permeable polymer sheet 12 having an adhesive strip 13 around the periphery as shown in FIG. 4. The margin between and around the shell 11 and sheet 12 is sealed as by heat sealing. The shell 11 and sheet 12 form a chamber or space 14 wherein a gas can be released upon demand through the permeable sheet 12 to the fruit or vegetable. Crystals of (2-chloroethyl) phosphonic acid (ethrel) 18 are applied with an adhesive, such as contact cement to sheet 12. Space 14 contains a relatively unreactive dry gas such as air, oxygen, nitrogen, which does not affect the development of the fruit or vegetable. Affixed to the inside of the shell 11 inside the space 14 is a button 15 including a cover 16 which is secured and is sealed to the shell 11. The button 15 confines aqueous gel 17 having a high pH, preferably between about pH 7 and 13 with higher pH levels yielding more rapid reaction rates. The button 15 is rupturable by the application of finger pressure to the shell 11 so that the button 15, cover 16 bursts, shown in FIG. 5 as broken cover 16A, and the gel 17 contacts the ethrel 18. The result is that ethylene gas is generated in the space 14 which diffuses through the sheet 12 to the fruit or vegetable over time. When the fruit or vegetable is ready to be eaten, the patch 10 can be removed if the skin of the fruit is to be eaten. With bananas 100, the skin is discarded and thus there is no need to remove the patch 10. Before use of the patch 10, a removable sheet 19 (FIG. 3) is used to protect the adhesive. Such materials are well known in the packaging tape art. The removable sheet 19 should be relatively gas impermeable.

Preferably the gas for ripening is ethylene produced by (2-chloroethyl) phosphonic acid reacted with a base as in FIGS. 1 to 4. The base is preferably inorganic and includes alkali metal and alkaline earth metal bases, particularly hydroxides such as sodium and potassium hydroxide. The pH should be between about 8 and 11 preferably pH 10. The reaction is

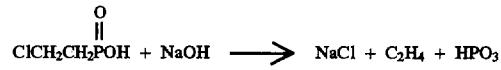

The gel for the base used is preferably alkaline MIRA-GEL (Staley Manufacturing Co., Decatur, Ill.) which is a water-binding starch product. Numerous other base stable water binding gels can be used such as agarose or carrageenan.

FIG. 14 shows a patch 30 with a shell 31, porous sheet 32 and with adhesive 33 sealing them together. A space 34 confines ethylene as a purified gas or as gas released from an enclosed ethylene-releasing compound (e.g., silaid or alsol, where silaid is (2-chloroethyl)methylbis(phenylmethoxy)silane and alsol is (2-chloroethyl)tris(2-methoxyethoxy)silane) that does not require the addition of a second compound. Relatively gas impermeable sheet 35 is held in place by adhesive 36. Sheet 35 is removed in use. FIG. 15 shows another patch 40 wherein in use a tape 41 with adhesive 43 is sealed with tape 42 with adhesive 43A. Ethrel 44 is applied to tape 42. The tapes 41 and 42 are brought together to combine base 46 and ethrel 44 so as to generate ethylene. Preferably the tape 42 is relatively gas impermeable. Adhesive 45 is used to apply the patch 40 to the fruit or vegetable.

The device of FIGS. 1 to 5 is preferred, since the ethylene is not released until the patch 10 is ready for use.

The device 10, 30 or 40 is used on a living plant material, including fruits and vegetables. The device 10, 30 or 40 is generally much smaller than the fruit or vegetable, the size being dictated by the requirements for ethylene. Usually the size of the spaces 14 or 34 is between about 1 and 3 cubic centimeters. Other chemicals which release ethylene will dictate different size requirements.

The permeable sheet 12, 32 or 41 is preferably composed of a film of a polymer. Table 1 shows a variety of such material which can be used.

TABLE 1

Polymer groups suitable for use in a ripening patch to permit the permeation of ethylene from the patch into the plant material:

| Polymer Group | Common Example |
| --- | --- |
| Polyalkenes | Polyethylene |
| Polyvinyls | Polypropylene |
| Polystyrenes | Polyvinyl chloride |
| Polysiloxanes | Silicon rubber |
| Polydienes | Natural Rubber |

Other permeable materials such as perforated metals and ceramics can be used but are more expensive.

The shell 11, 31 or tape 41 are preferably composed of a material or materials which is relatively gas impermeable. A metalized polymer film, such as aluminized polyethylene, or MYLAR (poly(oxyethylene oxyterephthaloyl), crystalline) is preferably used. Also metals (aluminum foil) or other materials which are relatively gas impermeable can be used. Such materials are well known to those skilled in the art.

The adhesive 13, 33, 43 and 43A is of the "sticky" type used on various packaging tapes. Such adhesives are well known to those skilled in the art.

The following are non-limiting examples of the device of the present invention.

EXAMPLE 1

FIGS. 1 to 4 show the patch 10. The shell 11 was aluminized MYLAR (as used in balloons). The sheet 12 was low density polyethylene (1 mil thick (0.00254 cm)) which was coated with ethrel 18 ((2-chloroethyl) phosphonic acid) with an adhesive which was contact cement. The button 15 was from a low density polyethylene bubble pack and contained alkaline buffered MIRAGEL (pH 10) gel 17 mixed with additional sodium hydroxide (100 mg NaOH to 1 ml gel by volume). The patch 10 was tested with flowing nitrogen to determine the release of ethylene from the shell 11 and sheet 12 and it was found that the sheet 12 released almost all of the ethylene. The minimum estimated release of ethylene to initiate ripening is about 0.037 nanomoles per second. The patch 10 released (300 to 700 nanomoles per second) several thousand times the necessary amount for triggering the ripening of a banana.

EXAMPLE 2

The patch 10 was applied to one finger of several hands of bananas. The results are shown in FIGS. 5 to 13. The finger where the patch 10 was applied ripened very rapidly (about 2 to 3 times faster) than those fingers where the patch 10 was not applied. Thus fingers of the banana can be selectively ripened. As can be seen from FIGS. 7, 9, 11 and 13, $CO_2$ levels are also elevated during ripening of the fingers of the bananas where the patch 10 was applied.

EXAMPLE 3

The patch 10, 30 or 40 is constructed enclosing a material which releases carbon dioxide such as an alkali metal or alkaline earth metal carbonate, particularly sodium bicarbonate in contact with acid. Thus in FIGS. 1 to 5 the carbonate replaces ethrel 18, and acid in the gel replaces the base and gel 17. When the shell 11 is pressed to rupture button 15, carbon dioxide is released. Thus gas represses the development of the fruit or vegetable. A second patch 10 is then used to release ethylene to ripen the fruit or vegetable.

Separate portions of a single shell 11 can be used for both carbon dioxide and ethylene generation (not shown). The sheet 12 has a permeability of $4.5 \times 10^{-7}$ $mmol.cm.cm^{-2}.hr^{-1}.kPa^{-1}$ (AFFINITY PF 1140, Dow Chemical Co., Midland, Mich.). This polymer permits the 7 mg $CO_2$ per hour for a 5.3 $cm^2$ patch 10. Thus about 0.6 gr of the sodium bicarbonate is used in the button 15.

Manometric Techniques, Burgess Publishing Company, Minneapolis, Minn., pages 44 and 45 (1964) shows how carbon dioxide can also be released from a $CO_2$ buffer such as diethanolamine.

The patch 10, 30 or 40 of the present invention can be applied to various fruits, such as banana, pear, apple, mango and vegetables, such as tomatoes. This device may be especially useful for the control of ripening of genetically altered fruits and vegetables that do not have the capacity to synthesize sufficient ethylene to instigate ripening (see article by Oeller et al, Science 254 437–439(1991)).

EXAMPLE 4

Technical grade ethrel 44 (10–20 mg) was applied to tape 42 by adhesive 43A and MIRAGEL gel (Staley Manufacturing Co., Decatur, Ill.) 46 which was buffered to pH 10 was applied to tape 41 by adhesive 43. The tape in this experiment was 1" wide household masking tape. In some cases, additional sodium hydroxide (about 5 to 10 µg) was sprinkled on the MIRAGEL 46 to increase its buffering potential. The tapes 41 and 42 were pressed together so that the edges were sealed around the ethrel and the gel. The patches were placed in a one pint jar with nitrogen gas flowing through the jar at a rate of 50 µl per min. Only the gel 46 with the additional base released ethylene, thus evidencing the necessity of sufficient base availability. Inasmuch as ethrel is an acid, the buffering capacity of the gel needs to be extremely high. This test indicated that the buffered gel was insufficiently buffered to permit maintenance of an elevated pH (7 to 13) when contacted with the ethrel. Addition of the sodium hydroxide increased the base strength sufficiently to maintain the needed pH range. The release of ethylene from ethrel 44 was complete after 24 hours. An adhesive 45 is applied to the patch 40 and the patch 40 is applied to a fruit or vegetable. The rate of release of ethylene is rapid, in this case averaging 120–150 nmoles per second. An improvement is to metalize the tape 42 to prevent the release of gas away from the fruit or vegetable.

As used herein the term "development" means texture, flavor, odor, growth, color and the like.

It is intended that the foregoing description be only illustrative of the present invention and that the present invention be limited only by the hereinafter appended claims.

I claim:

1. A method for affecting the development of a living plant material which comprises:

(a) providing a device for use on a living plant material to affect development of the plant material which device comprises a container means containing separate compositions which generate a development affecting gas when selectively combined, wherein the container means has a layer which is pervious to the gas upon generation of the gas; and an adhesive on an exposed portion of the container means around the layer so that the device can be sealed on the plant material to release the gas through the layer into the plant material; and (b) applying the container means to the plant material with the adhesive; and releasing the gas to the plant material by combining the compositions, wherein the development of the plant material is affected by the gas.

2. The method of claim 1 wherein the gas is ethylene which hastens ripening as the development of the plant material.

3. The method of claim 1 wherein the gas is caused to be released by application of pressure to the container means by providing one surface of said container with a first of the compositions and providing a second surface of said container with a second of the compositions, whereby the application of pressure to said container causes the mixing of said first and second compositions to release said gas.

4. The method of claim 3 wherein the gas is ethylene.

5. The method of claim 1 wherein the gas is carbon dioxide which affects the maturation by retarding ripening of the plant material.

6. The method of any one of claims 1, 2, 3 and 5 wherein the plant material is a fruit or vegetable.

* * * * *